June 18, 1968 D. D. WEBB 3,388,755
COMBINATION SHOCK ABSORBER AND JAR
Filed May 2, 1966 3 Sheets-Sheet 1
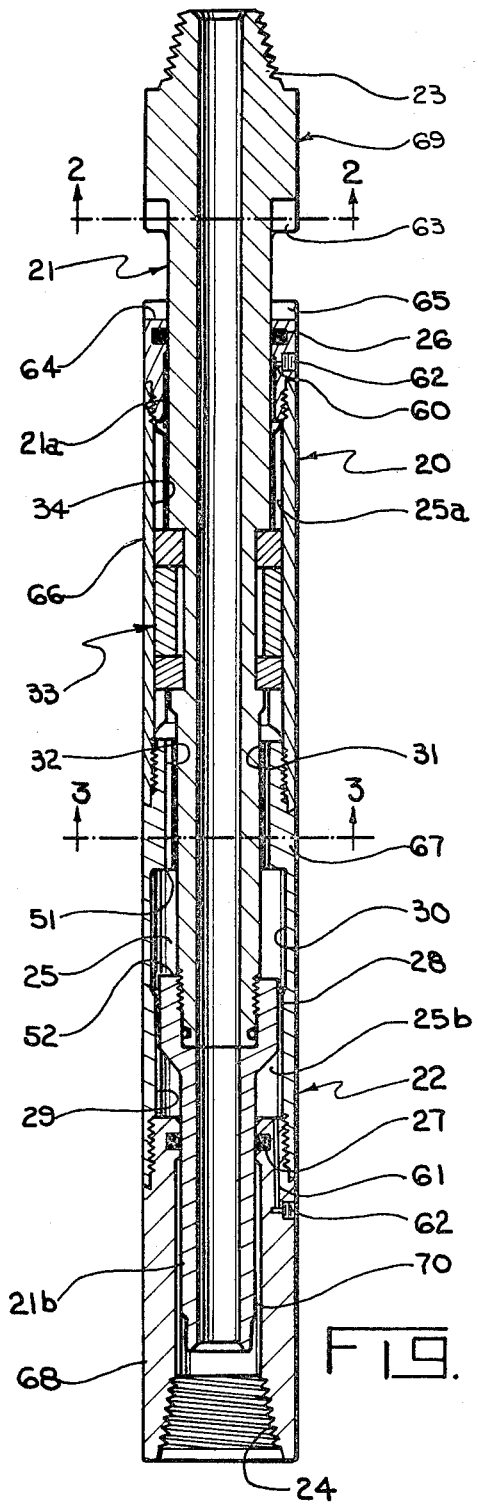
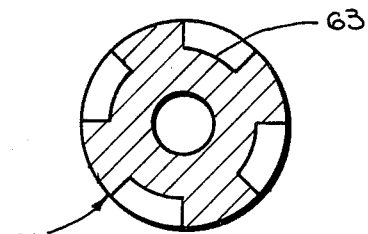
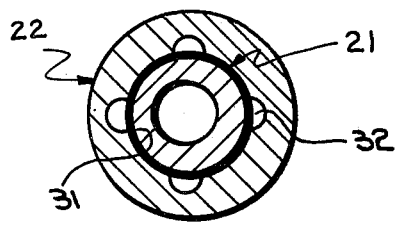
DERREL D. WEBB
INVENTOR.
ATTORNEY June 18, 1968  D. D. WEBB  3,388,755
COMBINATION SHOCK ABSORBER AND JAR
Filed May 2, 1966  3 Sheets-Sheet 2
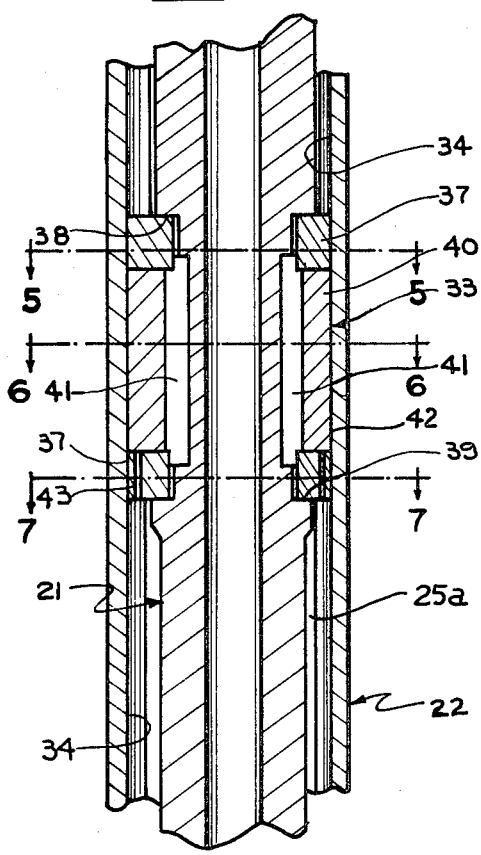
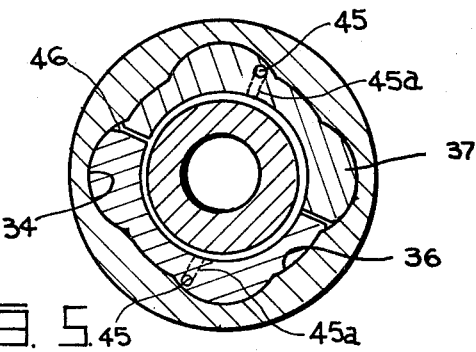
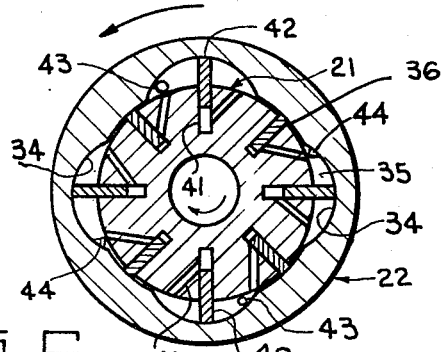
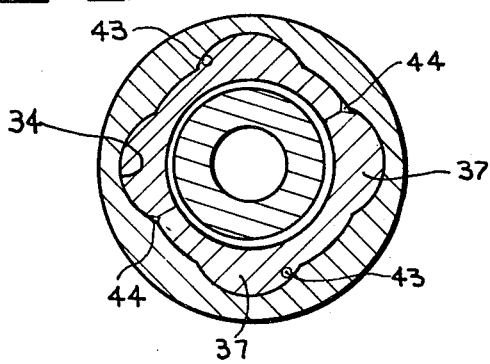
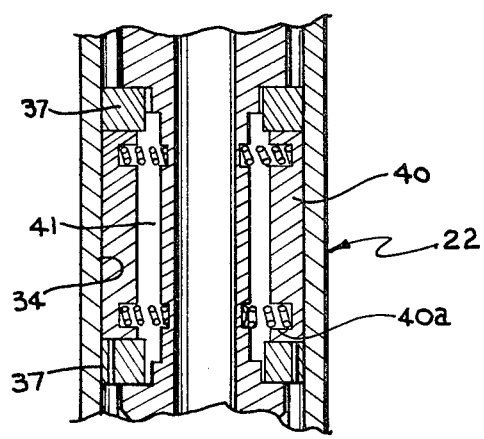
DERREL D. WEBB
INVENTOR.
BY Browning, Simmons, Hyer & Eickenroht
ATTORNEY June 18, 1968          D. D. WEBB          3,388,755
COMBINATION SHOCK ABSORBER AND JAR
Filed May 2, 1966          3 Sheets-Sheet 3
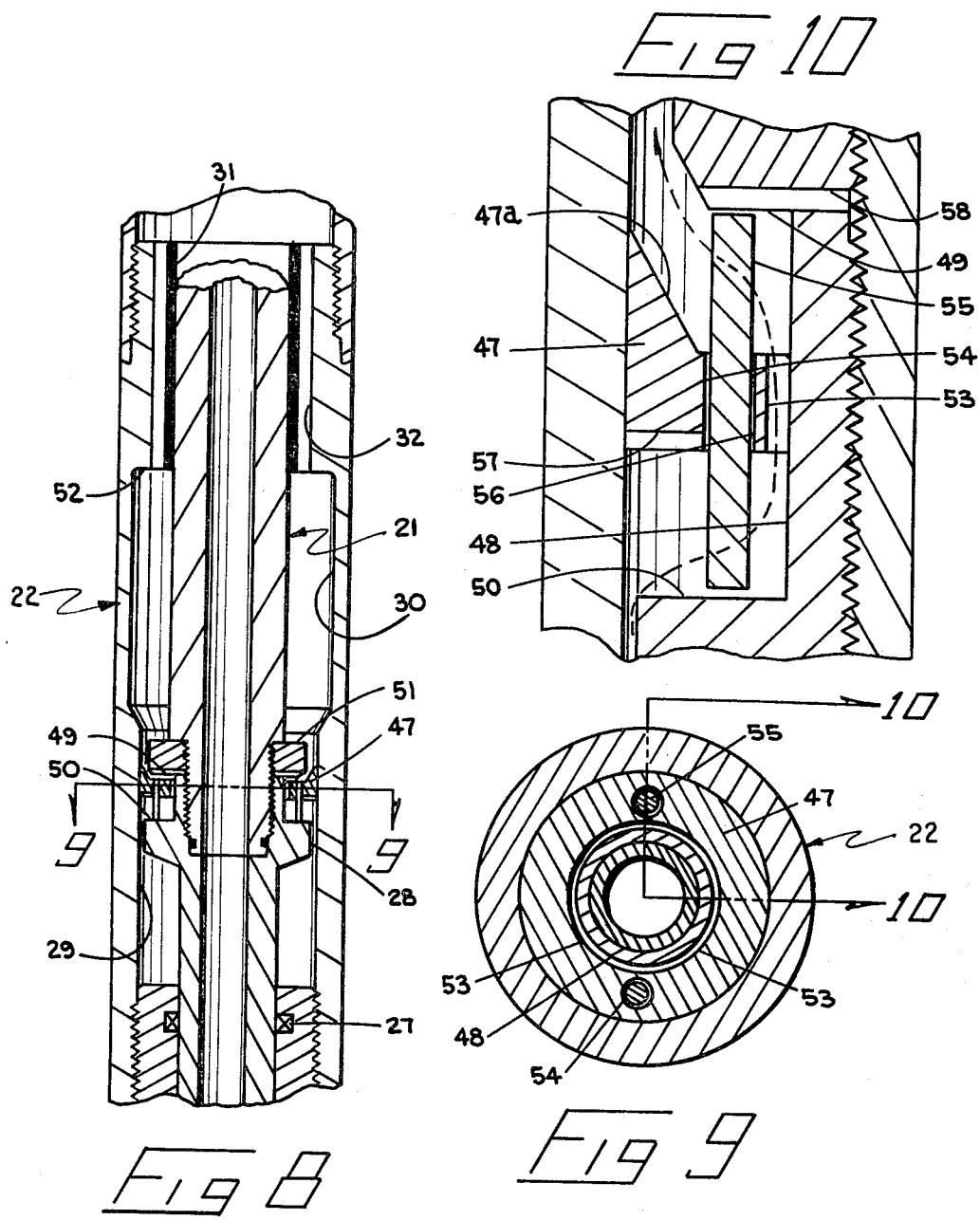
DERREL D. WEBB
*INVENTOR.*
BY Browning, Simms, Hyer & Eickenroht United States Patent Office 3,388,755
Patented June 18, 1968

3,388,755
COMBINATION SHOCK ABSORBER AND JAR
Derrel D. Webb, Houston, Tex., assignor to Houston
Engineers, Inc., Houston, Tex.
Filed May 2, 1966, Ser. No. 546,772
16 Claims. (Cl. 175—297)

ABSTRACT OF THE DISCLOSURE

A pair of tubular members are connectible in a pipe string and arranged telescopically of one another for relative longitudinal and rotational movement. The inner of said members has unequal outer diameter portions, and there are seals between the outer of said members and the unequal diameter portions of the inner member to provide a fluid chamber which is compressed upon relative movement of the members in one longitudinal direction. A fluid transfer means within the chamber urges the members in the one longitudinal direction in response to rotation of the members in one direction relative to the other. There is a means for dampening the relative longitudinal movement of the members by limiting fluid flow within the chamber during only the final portion of such movement. The members have opposed impact surfaces which engage upon relative movement between them in the outer longitudinal direction and beyond the operable range of the means for limiting flow within the chamber.

---

This invention relates generally to well tools, and particularly to improvements in tools adapted to be connected as a part of the rotary drill string during the drilling of a well. In one of its aspects, this invention relates to such a tool which is useful in absorbing shock loads in the string. In another of its aspects, this invention relates to such a tool which is useful in imparting a jar to a selected portion of the string. In still another of its aspects, this invention relates to a tool of this type which is useful in not only absorbing shock loads in the string, but also in imparting a jar to a selected portion of the string.

During the rotary drilling of a well, both torsional and axial shock loads are imparted to the drill bit, and unless these can be absorbed in some way, they may severely damage the portion of the drill string above the bit. It has been proposed to vulcanize a large annulus of rubber to relatively moveable tubular members adapted to be connected in the drill string so as to not only transmit torque and axial forces from the string to the bits, but also absorb these shock loads on the bit. However, among other things, the rubber annulus is obviously unsatisfactory for use in the high temperatures encountered in today's deep drilling. Although other shock absorbing tools may avoid this problem by using mechanical splines to transmit torque between the relatively moveable members of the drill string, these splines are subject to considerable wear and thus are frequent sources of failure in the drill string. This is especially true in view of the shock loads on the bit which transmit almost constant vibration to the splines.

Another problem encountered in the rotary drilling of a well is the tendency for the drill string to become stuck in the well bore. Obviously, the drill collars, which are larger than the drill pipe above them, are the most susceptible of sticking. Thus, it has been proposed to loosen the stuck collars by means of one or more tools, known as jars, connected above the collars. These jars consist of relatively reciprocal members having impact surfaces adapted to be engaged upon manipulation of the string. Preferably, they are hydraulically operated, because, in a manner well known in this art, this enables them to deliver a more controllable jar. In either case, however, these jars also transmit torque by means of mechanical splines, and, as noted above, these splines are subject to failure. This is especially true when, as is often the case, the stuck collars are unstuck only after considerable twisting of the drill pipe and thus impart severe torsional shock loads to the splines.

An object of this invention is to provide a drill string shock absorber which obviates the above-mentioned shortcomings of prior shock absorbers of this type; and, more particularly, which requires neither a rubber annulus nor mechanical splines between the relatively moveable members thereof.

Another object is to provide a jar which is particularly well suited for use in a drill string in that it is capable of imparting the desired torque by means other than mechanical splines; and, more especially, by a means which is yieldable to absorb shock loads thereon.

A more particular object is to provide a tool which is capable of accomplishing both of the foregoing objects.

A further object is to provide such a tool which is of compact and inexpensive construction.

In the drawings where there is shown, by way of illustration, one embodiment of the invention;

FIG. 1 is a longitudinal sectional view of a tool constructed in accordance with a preferred embodiment of the present invention;

FIG. 2 is a cross-sectional view of the tool, as seen along broken line 2—2 in FIG. 1;

FIG. 3 is another cross-sectional view of the tool, as seen along broken line 3—3 of FIG. 1;

FIG. 4 is an enlarged longitudinal sectional view of a mid-portion of the tool shown in FIG. 1;

FIG. 4A is a longitudinal sectional view of an alternate construction of such mid-portion of the tool;

FIG. 5 is a cross-sectional view of the mid-portion of the tool, as seen along broken line 5—5 of FIG. 4;

FIG. 6 is another cross-sectional view of the mid-portion of the tool, as seen along broken line 6—6 of FIG. 4;

FIG. 7 is still a further cross-sectional view of the mid-portion of the tool, as seen along broken line 7—7 of FIG. 4;

FIG. 8 is an enlarged longitudinal sectional view of a lower portion of the tool shown in FIG. 1;

FIG. 9 is a cross-sectional view of the lower portion of the tool, as seen along broken line 9—9 of FIG. 8; and FIG. 10 is a detailed sectional view, as seen along broken line 10—10 of FIG. 9, of a means for metering flow within the lower portion of a fluid chamber within the tool.

With reference now to the details of the above-described drawings, this tool, which is designated in its entirety by reference character 20, comprises a first or inner tubular member 21 telescopically received within a second or outer tubular member 22 for relative rotational and limited relative longitudinal movement with respect thereto. The first member 21 has male threads 23 at its upper end for connection to female threads of one portion of the drill string, and the second tubular member 22 has female threads at its lower end for connection to male threads of another portion of the drill string. Thus, the passageway through the coaxially aligned bores of the tubular members provides a continuation of the bore through the drill string above and below the tool. As will be described in more detail to follow, this invention contemplates the tool 20 may be connected either to that portion of the drill string just above the bit and below the drill collars, or to that portion of the drill string between the upper end of the collars and the lower end of the drill pipe, or, for that matter, intermediate the upper and lower ends of the collars. In fact, one or more such tools may be connected in each such location.

The outer diameter of the first member 21 is spaced from the inner diameter of the second member 22 to define an annular chamber 25 therebetween. This chamber is closed at its upper end by means of a seal ring 26 carried by the member 22 for sealing about an enlarged diameter portion 21a of member 21, and at its lower end by a seal ring 27 carried by a lower portion of the member 22 for sealing about a reduced diameter portion 21b of member 21. As a result of these unequal diameter portions, downward movement of the member 21 relative to the member 22 will lessen the volume of the chamber 25. The chamber is filled with a compressible fluid in the fully extended position of the members 21 and 22 relative to one another, so that this movement of the members toward a contracted position, as occurs when the tool is loaded, will compress the fluid in chamber 25. More particularly, the fluid is compressed to the degree necessary to provide a force which balances the load tending to move the members 21 and 22 of the tool to collapsed position. Conversely, of course, when the load is relieved, the compressed fluid will tend to expand the chamber 25 and thereby urge the members 21 and 22 toward their extended positions.

As shown diagrammatically, a portion of tubular member 21 is provided with an enlargement 28 for reciprocation within a restricted diameter portion 29 of the tubular member 22 within the lower portion of fluid chamber 25 during the final stage of downward movement of member 21 relative to member 22. Thus, when the tool is under relatively heavy load, fluid flow past the enlargement 28 is limited to dampen relative reciprocation of the members due to shock loads.

In the event this tool were to be used solely to absorb shock, it would be preferred to extend the restriction 29 for the entire length of the stroke of enlargement 28. However, in order that this tool may also be capable of functioning as a jar, this means for dampening reciprocation of the tubular members is so constructed as to provide an hydraulic detent as an upward strain is taken on the inner member 21 in its lower position. For this purpose, and as will be described in detail in connection with FIGS. 8 to 10, the inner diameter of the outer member 22 is enlarged at 30 above the restriction so that the enlargement is released for free movement upwardly within the fluid chamber as it moves out of the restriction. Thus, in this preferred embodiment of the invention, a compromise has been made to provide the tool with its shock absorbing function during that period of its use when it is normally needed the most.

The tool 20 is stabilized by a bearing in the tubular member 22 about an intermediate portion of the tubular member 21 above the enlargement 28. As best shown in FIG. 3, the bearing preferably comprises a metal sleeve 31 surrounded by longtiudinally extending passageways 32 providing communication between the fluid chamber portions 25a and 25b above and below the bearing, respectively.

Disposed within the upper fluid chamber portion 25a is a fluid transfer means 33 operable, in a manner described below, to convert relative rotational movement of the tubular members 21 and 22 into relative longitudinal movement therebetween. More particularly, this means is responsive to such relative rotation to move the tubular member 22 upwardly relative to the tubular member 21, which, as previously described, reduces the volume of the chamber 25 and thereby compresses the fluid therein. Thus, the fluid is compressed to an amount to provide a force sufficient to transmit torque between the tubular members. Furthermore, during that portion of the movement of member 22 which is dampened by the downward travel of enlargement 28 with restriction 29, the fluid transfer means enables the tool to absorb these rotational shock loads simultaneously with absorption of the axial shock loads.

As well known in the art, a drill string is rotated in a right hand direction. Thus, when the bit of the drill string encounters shock loads, it will be caused to lag the right hand rotation of the upper portion of the drill string. Similarly, when the collars become stuck in the well bore, they lag the right hand rotation of the drill pipe above them. Thus, the fluid transfer means 33 is so constructed as to transmit right hand torque from member 21 to member 22 in that it is responsive to right hand rotation of the tubular member 21 relative to tubular member 22 in causing member 22 to move upwardly relative to member 21.

As best shown in FIGS. 4 to 7, the fluid transfer means 33 is similar in construction to a rotary pump in which vanes are mounted on the tubular member 21 for relative rotation with a casing within the tubular member 22. However, as distinguished from conventional pumps, the relative reciprocation of the tubular members causes the vanes to reciprocate relatively with respect to the casing. More particularly, the inner diameter of the tubular member 22 within upper chamber portion 25a has recesses 34 which provide circumferentially spaced apart cavities 35 about the outer diameter of tubular member 21. As shown in FIG. 6, these chambers are separated from one another by means of intermediate cylindrical portions 36 on the tubular member 22 fitting closely to adjacent portions of the member 21.

Complementary upper and lower sets of plates 37 are fitted closely within the cavities 35 and about tubular member 21 so that, as best shown in FIGS. 4 and 5, they are free to slide longitudinally within outer member 22 upon relative reciprocation of the members. At the same time, the plates are held against rotation and abut with one another to provide barriers to close off the cavities 35. As shown in FIG. 4, the upper plates are held down by shoulder 38 about tubular member 21, and the lower plates 37 are held up by a lower shoulder 39 about such member.

Vanes 40 are carried by the inner tubular member 21 for rotation therewith within the cavities 35 between the plates 37. More particularly, the upper and lower edges of these vanes are slidably engageable with the oppositely facing surfaces of the upper and lower sets of plates so as to hold such sets apart as the tubular members 21 and 22 rotate relative to one another during operation of this tool.

As shown in FIG. 6, each vane 40 is mounted within a radially extending slot 41 in the outer diameter of inner tubular member 21 for movement radially inwardly and outwardly with respect thereto. More particularly, when the means 33 is operative to transfer fluid in the manner above described, the outer edge 42 of each vane is urged radially outwardly into engagement with the inner surface of the outer tubular member 22, as defined by the cavities 34 and cylindrical portions 36. The manner in which this contact is maintained as the tubular members move relative to one another will be described to follow.

As previously described, rotational shock loads on the drill string will cause the inner tubular member 21 to move in a right hand direction relative to the outer tubular member 22 or, conversely, the outer tubular member 22 to move in a left hand direction relative to the inner tubular member 21 (see the arrows in FIG. 6). Thus, in order to cause tubular member 22 to move upwardly relative to tubular member 21 in response to such relative rotation, it is necessary for the means 33 to transfer fluid from the portion of the chamber 25 beneath it to the portion thereof above it. For this purpose, ports 43 are formed in each lower plate 37 to connect the chamber beneath the plates with the trailing sides of oppositely disposed cavities 34. Also, the abutting edges of the bottom plates 37 are chamfered at their radially outer ends to form additional ports 44 connecting the chamber beneath the plates with the trailing sides of the other pair of oppositely disposed cavities 34.

On the other hand, ports 45 are formed in the upper plates 37 to connect the leading sides of the first mentioned pair of oppositely disposed cavities 34 with the chamber 25 above the plates. Still further, the abutting side edges of upper plates 37 are chamfered at their radially outer ends to form additional ports 46 connecting the leading sides of the other pair of oppositely disposed cavities 34 with the portion 25a of the fluid chamber 25 above the upper plates. As a result, and as will be best understood from FIG. 6, as the vanes 40 move in a right hand direction relative to the chambers 34, they will pass over the ports 43 and 44 during an initial portion of their stroke and over the ports 45 and 46 during substantially the remainder and major portions of their strokes within the chamber 34.

As a result, and as will be apparent to those skilled in this art, this relative rotation between tubular members 21 and 22 will pump fluid from the portion of the chamber 25 beneath the lower plates to the portion thereof above the upper plates. Thus, as previously described, whether the shock on the portion of the drill string beneath the tool is in an upward direction relative to the portion thereof above the tool, or in a left hand rotational direction relative to such upper drill string portion, or in both such directions, the result is to raise tubular member 22 relative to tubular member 21 and thereby increase the pressure of fluid within the chamber 25.

As shown in FIG. 6, auxiliary ports 41a connect the radially inner ends of each of vane slots 41 with the outer diameter of tubular member 21. More particularly, the outer end of each port 41a connects with the outer diameter of tubular member 21 just forwardly of the leading edge of the vane 40 disposed within the slot with which the other end of the port connects. Thus, as the vanes move past the ports 43 and 44 in a right hand direction relative to the tubular member 22, the high pressure fluid with the pump chamber 35 is connected with the rear sides of the vanes to urge their outer edges into engagement with the cavity walls. Thus, during the working stroke of the pump in transferring fluid from that portion of the chamber above such means, the vanes are in effect self energized into sealing engagement with the cavity walls.

As shown by the broken lines of FIG. 5, additional auxiliary ports 45a connect the ports 45 intermediate their upper and lower ends with the inner diameter of the upper plate 37 through which the ports 45 extend. Since the ports 45 are on the high pressure side of the vanes 40 during their working stroke, high pressure fluid is effective through the auxiliary ports 45a to move the upper and lower sets of plates 37 radially outwardly into engagement with the cavity walls 34.

As previously described, when the axial loads are removed from the tool, the compressed fluid within the chamber 25 will urge outer tubular member 22 downwardly relative to inner tubular member 21. In the event that the vanes 40 of the fluid transfer means 33 are at all times urged outwardly against the cavity walls, as will be described in connection wtih FIG. 4A, this relative movement of the tubular member toward its extended, unloaded position causes a resulting rotation of the outer member 22 in a left hand direction relative to the inner member 21. In other words, the function of the fluid transfer means is reversed so as to cause the vanes to move in an opposite working direction from that above described.

However, in this reversed cycle of operation of the embodiment of the tool shown in FIGS. 4 and 6, the self-energizing of ports 41a are on the trailing side of vanes 40, so that the vanes are not urged outwardly into engagement with the cavity walls. As a result, as the outer tubular member 22 moves downwardly relative to the inner tubular member 21, there is ordinarily no rotational movement between such members. Then, when the relative axial positions of the tubular members are stabilized, and the outer tubular member 22 is again caused to move upwardly relative to inner tubular member 21, as in response to either an axial or rotational shock load, the fluid transfer means would again begin a working stroke in that the vanes 40 would move in a right hand direction relative to the cavity walls of the outer tubular member 22.

In alternative construction shown in FIG. 4A, the vanes 40 are urged outwardly against the cavity walls at all times by means of springs 40a disposed between the inner ends of the vanes and inner ends of the slots 41 in which the vanes are disposed. In this case, of course, as the tool is unloaded, the function of the fluid transfer means 33 is reversed so that downward movement of outer tubular member 22 relative to the inner tubular member 21 causes a corresponding rotation of the inner member in a left hand direction relative to the outer member, and, conversely, rotation of the outer member in a left hand direction relative to the inner member causes such outer member to move downwardly relative to the inner member. Also, of course, suitable means (not shown) such as springs or the like may be used for the purpose of maintaining the plates 37 in tight sealing engagement with the cavity walls.

As best shown in FIGS. 8 to 10, the enlargement 28 on tubular member 21 includes a seal ring 47 carried about a recess 48 of the piston body intermediate upper and lower annular shoulders 49 and 50 thereon. More particularly, the seal ring has an upwardly facing lip 47a adapted to be compressed into sealing engagement with the restricted portion 29 or the tubular member 22. On the other hand, when enlargement 28 moves upwardly into the enlargement 30 of the bore through the tubular member 22, the seal ring 47 is out of engagement therewith, so that, as previously described, there is free fluid flow therepast.

The enlargement 28 also includes means of such construction as to permit metered flow therepast at a relatively fast rate during its downward movement relative to the restriction 29 and at a relatively slow rate during its upward movement relative thereto. In this way, the seal ring may be moved relatively quickly into the restriction 29 to dispose it in position to act as an hydraulic detent during upward travel of the tubular member 21. That is, during upward stroke of the enlargement 28 within restriction 29, the upward movement of tubular member 21 relative to tubular member 22 is retarded to such an extent as to stretch and thereby store energy in the drill string connected to the upper end of tubular member 21. Then, as the piston moves out of the restriction 29 and into enlargement 30, fluid is free to flow quickly therepast, so that the strain taken in the drill string will accelerate upward movement of a jarring surface 51 on the upper side of enlargement 28 against jarring surface 52 on the reduced diameter portion of member 22 surrounding bearing sleeve 31, and thus jar the drill string connected beneath the tubular member 22.

As the inner tubular member 21 moves downwardly relatively to the outer tubular member 22 so as to set the jar by disposing enlargement 28 within restriction 29, the volume of chamber 25 is, of course, reduced so as to compress the fluid therein. This raising of the fluid pressure is especially advantageous as it accelerates the jarring stroke. That is, the higher fluid pressure provides just that much more force which must be exerted in pulling the seal ring 47 from the restriction 29, and thus places an even greater strain in the drill string above the tool.

Toward this same end, the diameter of the sealing engagement between the seal ring 47 and restriction 29 is preferably greater than that of seal ring 26. In this manner, the fluid in chamber 25 is further compressed during the upward detent stroke of the inner member 21. That is, due to the relatively small flow path past the seal ring during its upward stroke with restriction 29, the portion of the chamber above the ring is effectively separated from the portion below it.

As best shown in FIGS. 9 and 10, this fluid metering means includes an annular bypass passage 53 between the recess about the inner member and the inner diameter of seal ring 47, as well as annular passageways 54 between a pair of pins 55 and openings 56 in the seal ring 47 through which the pins extend during reciprocation of the seal ring. The lower side of the seal ring is provided with bypass grooves 57 extending radially outwardly from the openings 56 to the outer diameter of the seal ring. Thus, during the upward detent stroke of the inner member, the seal ring is in its lowermost position to seat on shoulder 50 of the piston body, and the inner circumference of the seal ring 47 seats against the shoulder 50 so as to restrict the passage of fluid through grooves 57 and annular passageways 54 about pins 55.

There are also radial bypass grooves 58 formed in the shoulder 49 of the piston body. Thus, as will be understood from FIG. 10, during the downward setting stroke of the member 21, the seal ring 47 is in its upper position relative to the recess 48 so as to seat on shoulder 49. Thus, fluid is free to flow through grooves 58 into the annular passageway 53 as well as the annular passageways 54. Therefore, as previously described, there is a comparatively larger flow-path past the piston 28 so as to permit this setting stroke to be at a greater rate than the detent stroke.

In accordance with the present invention, chamber 25 is filled in the fully extended position of the tool 20 with a liquid having a relatively high degree of compressibility. Preferably, it comprises a liquid of the silicone group which is also shear resistant during motion and at high temperatures. A suitable fluid of this type, known as DC 210, has a compressibility of 12½% at 37,500 p.s.i. The chamber is charged with this fluid through fill ports 60 and 61 in the upper and lower ends, respectively, of the tubular member 22, which are opened and closed by means of plug 62.

In the event the tool should fail in the sense that fluid is lost from the chamber 25, the tubular member 21 would be free to move downwardly relative to outer tubular member 22, so that the tool would collapse as load was placed thereon during the drilling operation. In order to then transmit torque between the portions of the drill string to which the tool is connected, and as shown in FIGS. 1 and 2, upper portions of tubular members 21 and 22 are provided with complementary locking parts 63 and 64, respectively, for engagement with one another in torque transmitting relation upon such contraction of the tool. Obviously, upon extension of the tool and in its normal operating position, the parts 63 and 64 are disengaged so that torque is transmitted by the fluid coupling and shock absorbing means previously described.

These same parts 63 and 64 provide an absolute limit to the amount to which the tubular members 21 and 22 may be contracted. For all practical purposes, and assuming that the fluid is not lost from the chamber 25, the tubular members will not reach this fully contracted position, because of the pressure of the fluid within the chamber. The fully extended position of the tubular members is, of course, defined by the engagement of impact surfaces 51 and 52.

For manufacturing and assembly purposes, the outer tubular member 22 is made up of tubular parts 65, 66, 67 and 68. As shown in FIG. 1, the upper most tubular part 65 carries seal ring 28 as well as fluid chamber filling port 60 and plug 62 therefor. The tubular part 66 threadedly connected to the lower end of part 65 has the pump cavity walls 35 formed therein, while tubular part 67 threadedly connected to the lower end of tubular part 66 has the bearing including sleeve 31 formed in its upper end and enlarged and reduced dimeter portions 30 and 29, respectively, formed therein beneath the bearing. The lowermost tubular part 68 carries the seal ring 27 as well as fluid chamber filling port 61 and plug 62 therefor. It is also provided with the box 24 for connection with a lower portion of the drill string.

The inner tubular member 21 merely comprises upper and lower tubular parts 69 and 70. The upper part has the threads 23 at its upper end for connection with the upper portion of the drill string and is formed about its intermediate portion to receive the vanes 40 as well as accommodate the end plates 37 of the fluid transfer means. The lower tubular part 70 has the enlargement 28 about its upper end and threadedly connected to the lower end of upper tubular part 69.

In the assembly of the tool, the tubular part 65 of member 22 is first moved over the lower end of tubular part 69 of tubular member 21. The various parts of the fluid transfer means, including vanes 40 and end plates 30, are then assembled about the tubular part 69 beneath part 65 previously assembled over it. As these members of the fluid transfer means are held in place, tubular part 66 is moved over the outside of them and about the tubular part 69 for threadedly making up with tubular part 65. At this time, tubular part 67 is moved over the lower end of tubular part 69, after which tubular part 70 may be moved into part 67 and threadedly made up with the lower end of part 70. Finally, tubular part 68 is fitted over the lower end of part 70 and threadedly made up with the lower end of tubular part 67 of member 22. With the tool thus assembled and moved to its fully extended position in which impact surfaces 51 and 52 are engaged, chamber 25 is filled with fluid of the type previously described.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A well tool, comprising a pair of tubular members adapted to be connected in a pipe string and telescopically arranged for longitudinal and rotational movement relative to one another, means providing a fluid chamber between said members, means on the inner of said members moveable into and out of a restricted portion of the outer member within the chamber so as to limit flow therepast during longitudinal reciprocation between said members, impact surfaces on the members engageable with one another upon movement of said means on the inner member out of the restricted portion of the outer member so as to impart a jar thereto, and means on the members within said chamber for transmitting torque between them with a force which is yieldable in response to torsional shock loads in excess of said force.

2. A well tool of the character described in claim 1, wherein said fluid chamber providing means comprises seal means between unequal diameter portions of said members so as to reduce the volume of said chamber and thereby increase the pressure of the fluid in said chamber upon relative longitudinal movement of said members in one direction, and the force of said torque transmitting means is increased in response to said reduction in volume of said chamber.

3. A well tool of the character defined in claim 2, wherein the flow limiting means on the inner member moves into the restricted portion of the outer member during the final stage of the relative longitudinal movement of said members in said one direction.

4. A well tool, comprising a pair of tubular members adapted to be connected in a pipe string and arranged telescopically of one another for relative longitudinal movement, the inner of said tubular members having unequal outer diameter portions, means sealing between the outer of said tubular members and the unequal diameter portions of the inner tubular member to provide a chamber which is reduced in volume upon relative longitudinal movement of the members in one direction, a compressible fluid filling said chamber when said members are arranged longitudinally of one another to provide it with maximum volume, a restricted portion on the inner diameter of the outer member, and means on the inner of said members movable into the restricted portion for limiting flow therepast within said chamber upon relative movement of said members in said one direction, said members having impact surfaces adapted to engage upon relative movement in said other longitudinal direction into a position in which the inner member moves out of said restriction.

5. A well tool of the character defined in claim 4, wherein the diameter of the flow limiting means on the inner member is of a larger diameter than the larger diameter of its unequal outer diameter portions.

6. A well tool of the character defined in claim 5, wherein said tubular members are rotatable relative to one another and have means thereon for transmitting torque therebetween with a force which increases in response to relative longitudinal movement of said members in said one direction.

7. A well tool, comprising a pair of tubular members adapted to be connected in a pipe string and arranged telescopically of one another for relative longitudinal movement, means sealing between spaced apart portions of said members to provide a fluid chamber therebetween, the bore through the outer member having a restriction within the chamber, longitudinally spaced apart annular shoulders about the inner member forming an annular recess therebetween, a seal ring about the inner member within the recess for limited longitudinal shifting between seated positions upon both the shoulders, the outer diameter of the seal ring being sealably engageable with the restriction in the bore of said outer member but being out of engagement with an enlargement in said bore adjacent said restriction, impact surfaces on said members adapted to engage upon movement of said seal ring out of said restriction and into said enlargement upon relative longitudinal movement of said members in one direction, and means for metering flow past said seal ring as it is sealably engaged with said restriction during relative longitudinal movement of said members, said metering means comprising bypass means providing a flow path past said seal ring upon seating of the seal ring upon one of said shoulders in response to relative longitudinal movement of said members in said other direction, and at least one pin extending longitudinally through a restricted opening in the seal ring as the seal ring shifts between said shoulders so as to provide a metered flow path about the pin upon seating of the seal ring upon both shoulders.

8. A well tool of the character defined in claim 7, wherein said sealing means seals between unequal diameter portions of said members so that the volume of said chamber is reduced as said members move longitudinally of one another in said other direction.

9. A well tool, comprising a pair of tubular members connectible in a pipe string and arranged telescopically of one another for relative longitudinal and rotational movement, the inner of said members having unequal outer diameter portions, means sealing between the outer of said members and the unequal diameter portions of the inner member to provide a fluid chamber which is compressed upon relative movement of the members in one longitudinal direction, fluid transfer means within said chamber for urging said members in said one longitudinal direction responsive to rotation of the members in one direction relative to one another, and means for dampening at least the final portion of the relative longitudinal movement of said members in said one longitudinal direction.

10. A well tool of the character defined in claim 9, wherein the relative longitudinal movement of said members in said one longitudinal direction moves them toward a collapsed telescopic position relative to one another.

11. A well tool of the character defined in claim 9, wherein said damping means includes means on said members operable during only said final portion of relative longitudinal movement between said members for limiting fluid flow within the chamber, said members having opposed impact surfaces adapted to engage upon relative movement therebetween in said other longitudinal direction and beyond the operable range of flow limiting means.

12. A well tool of the character defined in claim 3, wherein said flow limiting means limits flow within said chamber to a lesser extent during relative longitudinal movement of said members in said one direction than during relative longitudinal movement thereof in said other direction.

13. A well tool, comprising a first tubular member having means for connecting it to a portion of the pipe string, a second tubular member having means for connecting it to another portion of the pipe string and arranged telescopically within the first tubular member for relative longitudinal and rotational movement with respect thereto, and means sealing between longitudinally spaced apart portions of the tubular members to provide a fluid chamber therebetween, one of said sealing means being of larger diameter than the other so that fluid within said chamber is compressed upon relative longitudinal movement of the members in one direction, means responsive to relative movement between said members in one rotational direction for pumping fluid from one portion of the chamber to another in order to urge said members to move relatively to one another in said one longitudinal direction, and means on said members for limiting fluid flow within said chamber so as to dampen the relative longitudinal movement of the members during at least the final portion thereof in said one direction.

14. A well tool of the character defined in claim 13, wherein said flow limiting means comprises a seal ring on the inner member moveable longitudinally within a restricted portion of said outer member during only said final portion of relative longitudinal movement of said members in said one direction, and means for metering fluid flow past said seal ring to a lesser extent during relative longitudinal movement of said members in said one direction than during relative longitudinal movement of said members in said other direction.

15. A well tool, comprising first and second tubular members connectible in a pipe string and arranged telescopically of one another for relative rotational movement and relative longitudinal movement between limited extended and retracted positions, means on the first member for connection to an upper portion of the drill string and on the second member for connection to a lower portion of the drill string, means sealing between vertically spaced apart portions of the members to provide a fluid chamber therebetween, one of the sealing means being of larger diameter than the other sealing means so as to decrease the volume of said chamber upon upward movement of the second member relative to the first member, means including vanes on one of said members slideably engageable with the other of said members and barriers disposed across the chamber on opposite ends of the vanes to define pump cavities within said chamber, said barriers having ports therein connecting the cavities on opposite sides of the vanes with the chamber above and below the barriers so as to force fluid from one portion of said chamber to another, in response to relative rotation between the members in one direction, and thereby urge said second member in said one longitudinal direction relative to said one member, and means on the inner of said members moveable longitudinally within a restricted portion of the other member to limit fluid flow within said chamber and thereby dampen relative longitudinal movement of the members during at least the final portion thereof in said one longitudinal direction.

16. A well tool of the character defined in claim 15, wherein said means comprises a seal ring about the inner member sealably slideable within the restricted portion and means for metering fluid flow past the seal ring to a lesser extent during relative longitudinal movement of said members in said one direction than during relative longitudinal movement of said members in said other direction.

References Cited

UNITED STATES PATENTS

| | | | |
|---|---|---|---|
| 2,613,779 | 10/1952 | Milford | 64—26 |
| 2,641,445 | 6/1953 | Snyder | 175—107 |
| 3,005,505 | 10/1961 | Webb | 175—297 |
| 3,088,533 | 5/1963 | Sutliff | 175—297 |
| 3,133,617 | 5/1964 | Hartmann | 192—58 |
| 3,210,962 | 10/1965 | Birdwell | 64—26 |
| 3,316,986 | 5/1967 | Orr | 175—297 |

JAMES A. LEPPINK, *Primary Examiner.*

Disclaimer 3,388,755.—*Derrel D. Webb*, Houston, Texas. COMBINATION SHOCK ABSORBER AND JAR. Patent dated May 2, 1966. Disclaimer filed Feb. 26, 1979, by the assignee, *Houston Engineers, Inc.*

Hereby enters this disclaimer to all claims of said patent.

[*Official Gazette October 26, 1982.*]